United States Patent
Jackson

(10) Patent No.: US 8,011,322 B1
(45) Date of Patent: Sep. 6, 2011

(54) BIRD FEEDING ASSEMBLY

(76) Inventor: Daniel G. Jackson, Dillon, SC (US)

(*) Notice: Subject to any disclaimer, the term of this patent is extended or adjusted under 35 U.S.C. 154(b) by 240 days.

(21) Appl. No.: 12/401,898

(22) Filed: Mar. 11, 2009

(51) Int. Cl.
*A01K 39/01* (2006.01)

(52) U.S. Cl. .................................. 119/52.2; 119/61.57

(58) Field of Classification Search ............... 119/52.1, 119/52.2, 57.8, 429, 430, 477, 61.57; D30/124
See application file for complete search history.

(56) References Cited

U.S. PATENT DOCUMENTS

| | | | | |
|---|---|---|---|---|
| 553,752 A | * | 1/1896 | Goff | 209/244 |
| 574,312 A | * | 12/1896 | Emery | 119/52.1 |
| 797,404 A | * | 8/1905 | Cole | 119/65 |
| 1,225,645 A | * | 5/1917 | Kennedy | 119/52.1 |
| D115,321 S | | 6/1939 | Pueschel | |
| D154,407 S | * | 7/1949 | McCutcheon | D30/124 |
| 2,944,516 A | * | 7/1960 | Malloy, Sr. | 119/52.2 |
| D194,610 S | | 2/1963 | Hume | |
| 3,253,576 A | | 5/1966 | Tvedten | |
| 3,730,141 A | * | 5/1973 | Manning et al. | 119/51.5 |
| 4,942,845 A | * | 7/1990 | Lane | 119/52.2 |
| 5,063,877 A | | 11/1991 | Riggi | |
| 5,215,040 A | * | 6/1993 | Lemley | 119/57.9 |
| 5,507,249 A | | 4/1996 | Shaw | |
| 5,992,349 A | * | 11/1999 | Sachs | 119/52.1 |
| 6,439,158 B1 | | 8/2002 | Blohm | |
| 6,481,374 B1 | * | 11/2002 | Lillig | 119/52.1 |
| 6,662,746 B2 | | 12/2003 | Laske, Jr. | |
| 6,761,129 B1 | * | 7/2004 | Smith | 119/52.1 |
| 7,661,224 B1 | * | 2/2010 | Poyas | 47/42 |
| 2006/0112892 A1 | | 6/2006 | Hunter et al. | |
| 2006/0137617 A1 | * | 6/2006 | Leombruno | 119/52.1 |

* cited by examiner

*Primary Examiner* — Robert Swiatek
*Assistant Examiner* — Kristen C Hayes

(57) ABSTRACT

A bird feeding assembly includes a plurality of feeders. Each of the feeders includes a housing that has a bottom wall and a perimeter wall that is attached to and extends upwardly from the bottom wall. The perimeter wall has a fill opening extending therethrough. A chute has an open first end and an open second end. The first end is attached to the perimeter wall and is in fluid communication with the fill opening. The second end of the chute is positioned above the perimeter wall. Bird feed is positionable in the chute to fill the housing with the bird feed. A mounting bracket is attached to the chute. A strap is removably coupled to the mounting brackets of each of the bird feeders and extendable around a vertical support. A coupler on the strap couples the strap in a closed loop.

14 Claims, 5 Drawing Sheets

BIRD FEEDING ASSEMBLY

BACKGROUND OF THE DISCLOSURE

Field of the Disclosure

The disclosure relates to bird feeding devices and more particularly pertains to a new bird feeding device for holding bird feed to a vertical structure.

SUMMARY OF THE DISCLOSURE

An embodiment of the disclosure meets the needs presented above by generally comprising a plurality of feeders. Each of the feeders includes a housing that has a bottom wall and a perimeter wall that is attached to and extends upwardly from the bottom wall. The perimeter wall has a fill opening extending therethrough. A chute has an open first end and an open second end. The first end is attached to the perimeter wall and is in fluid communication with the fill opening. The second end of the chute is positioned above the perimeter wall to funnel material poured into the second end outwardly of the first end and onto the bottom wall. Bird feed is positionable in the chute to fill the housing with the bird feed. A mounting bracket is attached to the chute. A strap is removably coupled to the mounting brackets of each of the bird feeders and extendable around a vertical support. A coupler on the strap couples the strap in a closed loop.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
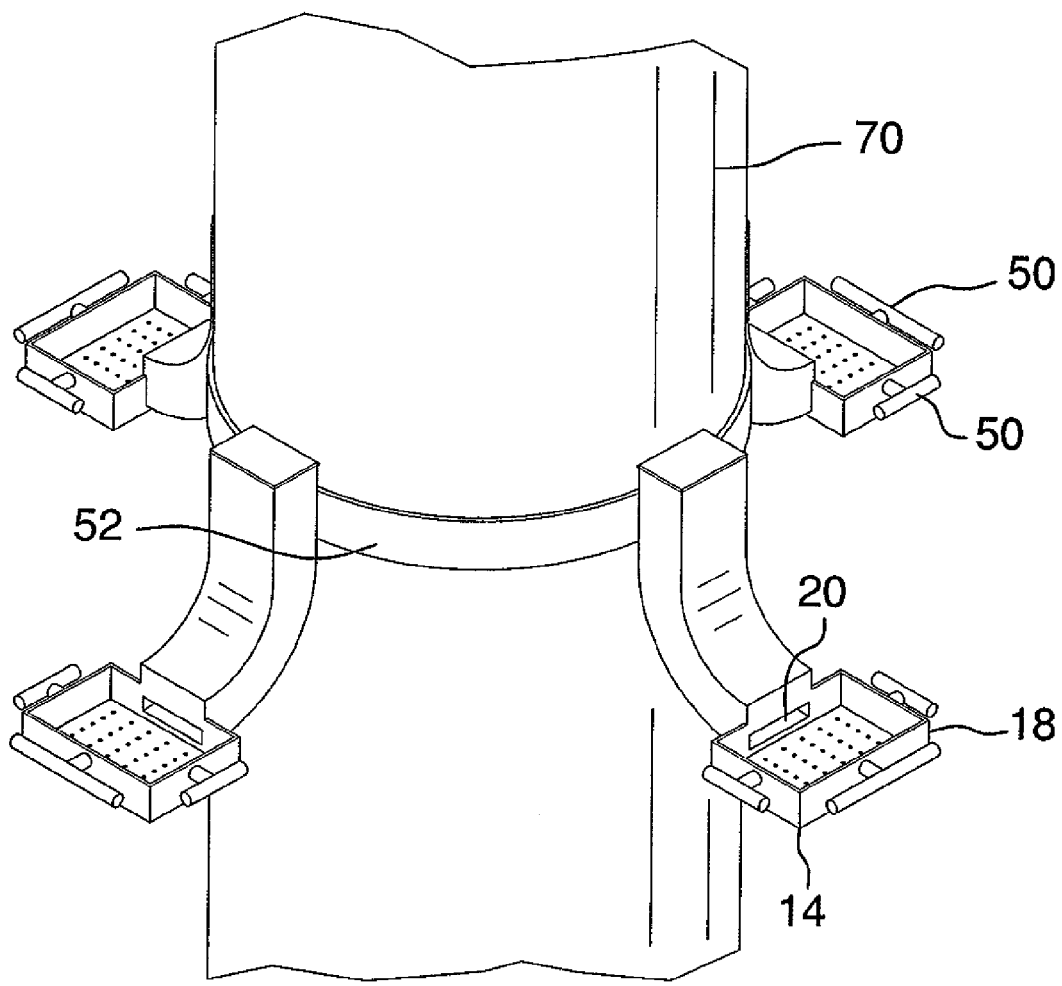
FIG. 1 is an in-use top perspective view of a bird feeding assembly according to an embodiment of the disclosure.

With reference now to the drawings, and in particular to FIGS. 1 through 5 thereof, a new bird feeding device embodying the principles and concepts of an embodiment of the disclosure and generally designated by the reference numeral 10 will be described.

As best illustrated in FIGS. 1 through 5, the bird feeding assembly 10 generally comprises a plurality of feeders 12. Each of the feeders 12 includes a housing 14 having a bottom wall 16 and a perimeter wall 18 that is attached to and extends upwardly from the bottom wall 16. The perimeter wall 18 has a fill opening 20 extending therethrough. The perimeter wall 18 includes a rear wall 22, a front wall 24, a first lateral wall 26 and a second lateral wall 28. The fill opening 20 is positioned in the rear wall 22. The bottom wall 16 has a plurality of water drainage holes 32 extending therethrough. The water drainage holes 32 prevent the buildup of rainwater in the housing 14. A chute 34 has an open first end 36 and an open second end 38. The first end 36 is attached to the perimeter wall 18 and is in fluid communication with the fill opening 20. The second end 38 of the chute 34 is positioned above the perimeter wall 18 to use gravity to funnel material poured into the second end 34 outwardly of the first end 36 and onto the bottom wall 16. The chute 34 is arcuate from the first end 36 to a central area of the chute 34. An upper portion 40 of chute 34 is linear and vertically orientated. Bird feed is positionable in the chute 34 to fill the housing 14 with the bird feed and the arcuate portion 42 of the chute 34 continually fills the housing 14 as it is emptied. This allows the chute 34 to function as a storage container for the bird feed.

The feeders 12 each include a mounting bracket 44 that is attached to the chute 34. The mounting bracket 44 is positioned on a back side of the chute 34 to position the chute 34 between the mounting bracket 44 and the housing 14. The mounting bracket 44 comprises a sleeve having an aperture 46 extending therethrough orientated parallel to a plane of the second end. The mounting bracket 44 is positioned nearer to the second end 38 than the first end 36 and on the upper portion 40 so that the aperture 46 is horizontally orientated.

Each of the feeders 12 further includes a cover 48 removably positionable over the second end 38 of the chute 34 to close the second end 38. The cover 48 is hingedly coupled to the chute 34. The cover 48 prevents rainwater, leave, twigs and other material from entering the chute 34. At least one bird perch 50 is attached to and extends outwardly away from the perimeter wall 18. As shown in the Figures, each of the front 24, first lateral 26 and second lateral 28 walls may have a bird perch 50 attached thereto.

Figure 2:
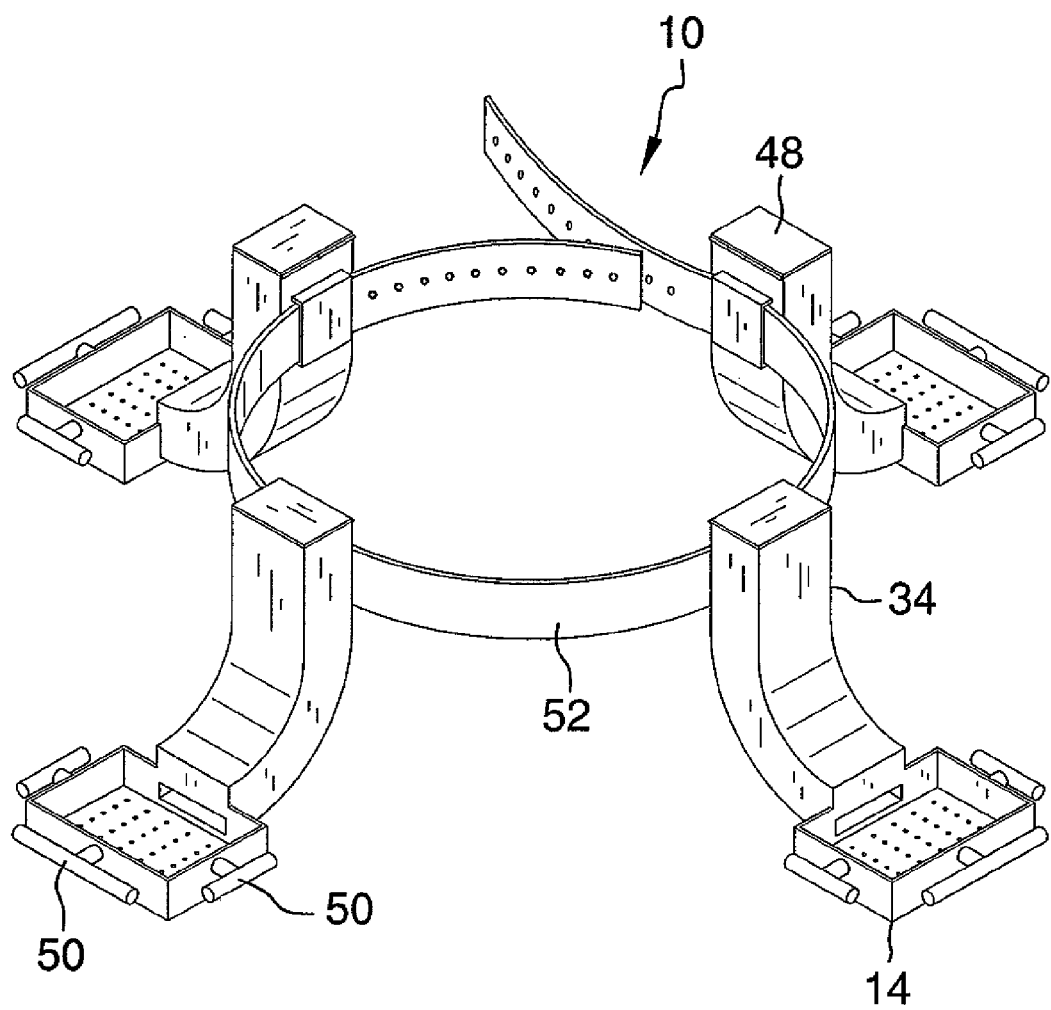
FIG. 2 is a top perspective view of an embodiment of the disclosure.
Figure 3:
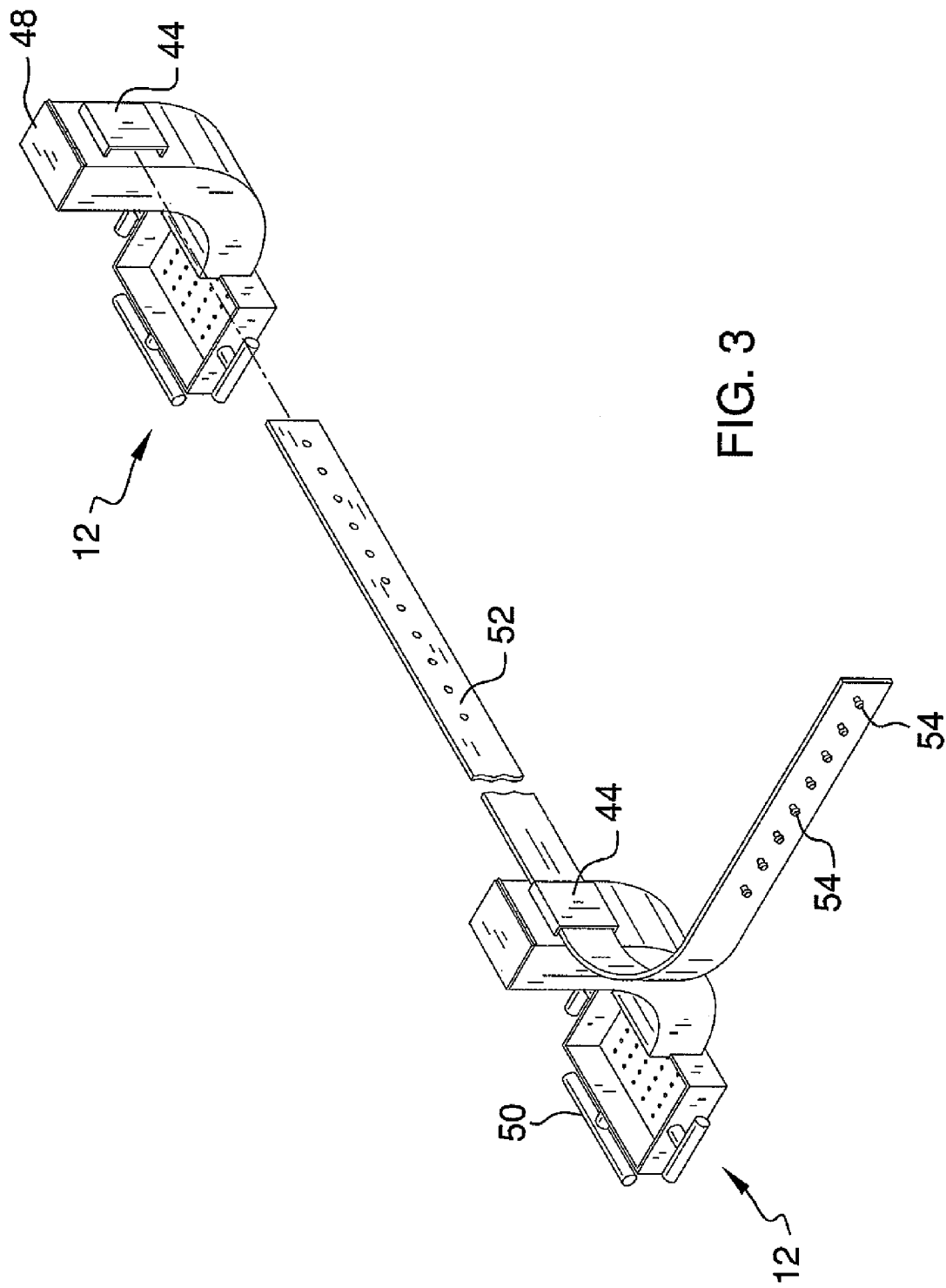
FIG. 3 is a rear perspective view of an embodiment of the disclosure.
Figure 4:
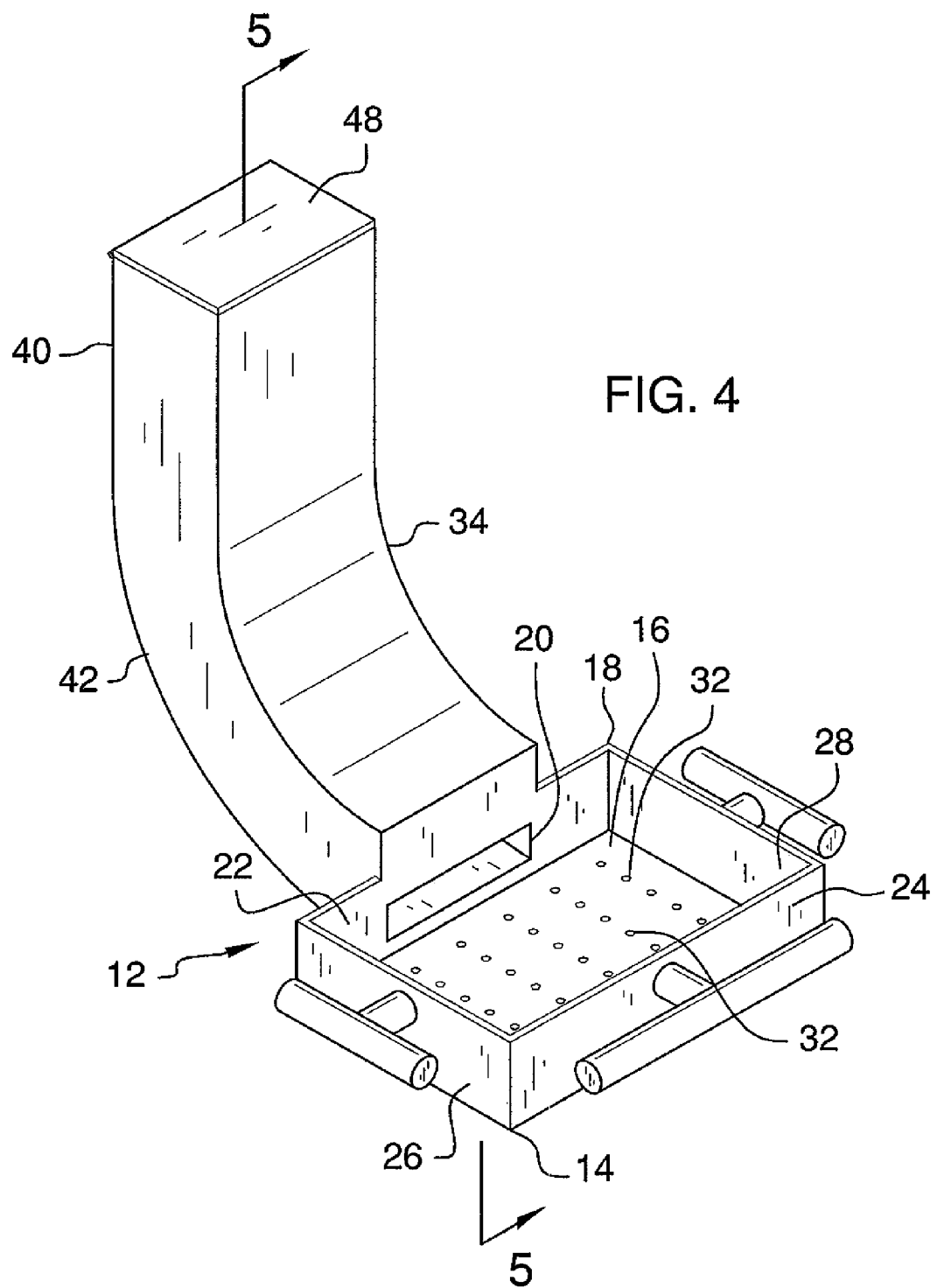
FIG. 4 is a top perspective view of a feeder of an embodiment of the disclosure.
Figure 5:
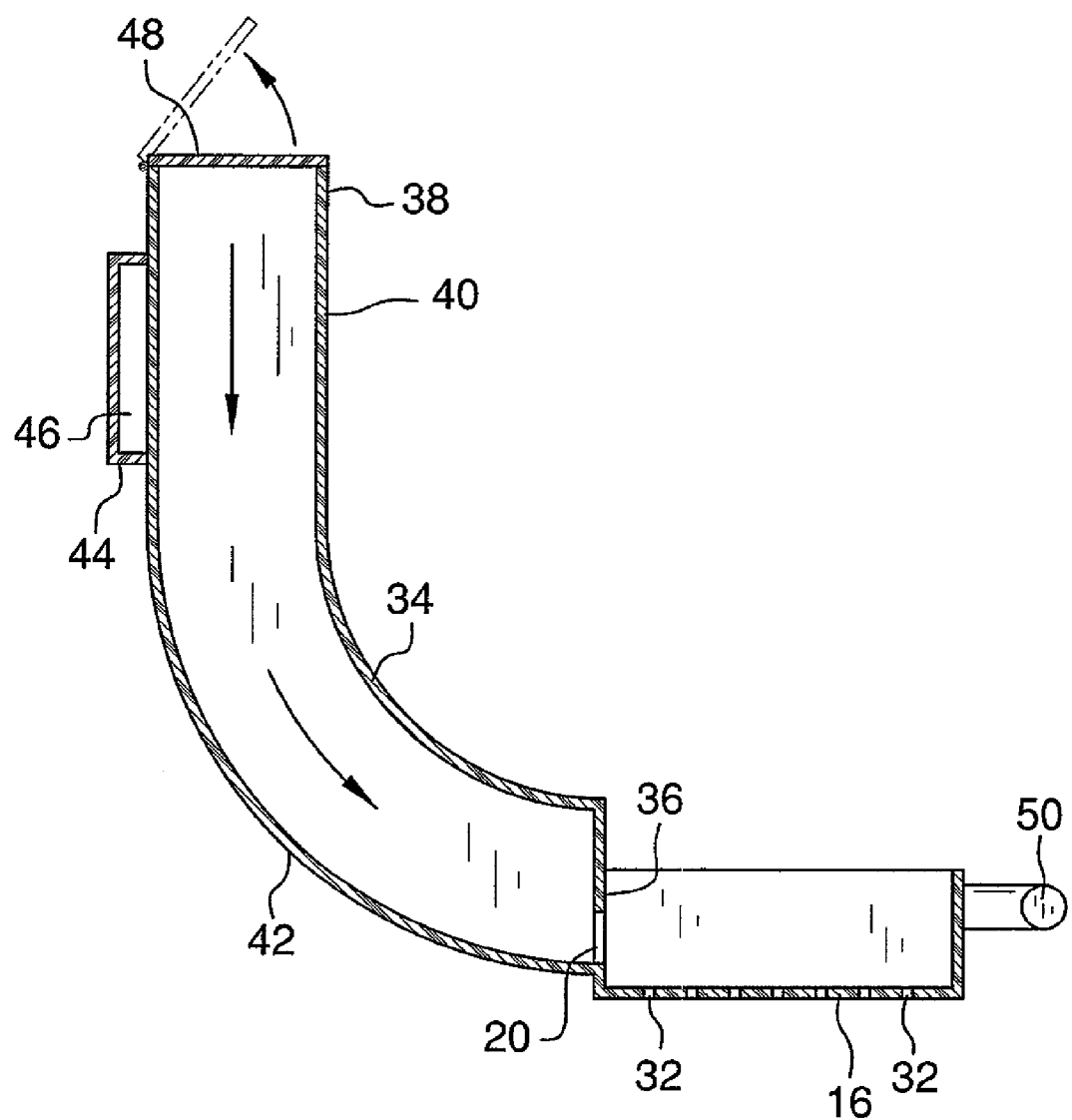
FIG. 5 is a cross-sectional view taken along line 5-5 of FIG. 4 of an embodiment of the disclosure.

A strap 52 is removably coupled to the mounting brackets 44 of each of the feeders 12 and is around a vertical support 70. In particular, the strap 52 is extended through the apertures 46 in the mounting brackets 44 and allows for multiple feeders 12 to be attached to the strap 52 as is shown in FIG. 2. A coupler 54 on the strap 52 releasably couples the strap 52 in a closed loop. The coupler 54 may include one or more detents extendable through notches in the strap 52. The detents are formed of a rust resistant material or a plastic material.

In use, a user of the assembly 10 decides how many feeders 12 are to be used and extends the strap 52 through the mounting brackets 44 of each of the selected feeders 12. The strap 52 is then extended around the vertical support 70, which may be a pole, a tree or the like, and secured in place using the coupler 54. Bird feed is then poured into the second end 38 so that it flows into the housing 14 and may be eaten by birds.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A bird feeding assembly being extendable around and couplable to a vertical support, said assembly including:
   a plurality of feeders, each of said feeders including;
      a housing having a bottom wall and a perimeter wall being attached to and extending upwardly from said bottom wall, said perimeter wall having a fill opening extending therethrough;
      a chute having an open first end and an open second end, said first end being attached to said perimeter wall and being in fluid communication with said fill opening, said second end of said chute being positioned above said perimeter wall to funnel material poured into said second end outwardly of said first end and onto said bottom wall, wherein bird feed is positionable in said chute to fill the housing with the bird feed;
      a mounting bracket being attached to said chute, said mounting bracket including a sleeve having an aperture extending therethrough orientated parallel to a plane of said second end, said mounting bracket being positioned nearer to said second end than said first end; and
   a strap being removably coupled to said mounting brackets of each of said bird feeders and extendable around the vertical support, a coupler on said strap coupling said strap in a closed loop.

2. The assembly according to claim 1, wherein said bottom wall of each of said feeders has a plurality of water drainage holes extending therethrough.

3. The assembly according to claim 1, wherein said chute of each of said feeders is arcuate from said first end to a central area of said chute.

4. The assembly according to claim 1, wherein said mounting bracket of each of said feeders is positioned nearer to said second end than said first end of a corresponding one of said feeders.

5. The assembly according to claim 1, wherein each of said feeders further including a cover, said cover of each of said feeders being removably positionable over a respective one of said second ends of said chutes to close said second ends.

6. The assembly according to claim 5, wherein each cover of said feeders is hingedly coupled to a respective one of said chutes.

7. The assembly according to claim 1, wherein each of said feeders includes at least one bird perch attached to and extending outwardly away from a corresponding one of said perimeter walls.

8. A bird feeding assembly being extendable around and couplable to a vertical support, said assembly including:
   a feeder including;
      a housing having a bottom wall and a perimeter wall being attached to and extending upwardly from said bottom wall, said perimeter wall having a fill opening extending therethrough;
      a chute having an open first end and an open second end, said first end being attached to said perimeter wall and being in fluid communication with said fill opening, said second end of said chute being positioned above said perimeter wall to funnel material poured into said second end outwardly of said first end and onto said bottom wall, wherein bird feed is positionable in said chute to fill the housing with the bird feed;
      a mounting bracket being attached to said chute, said mounting bracket including a sleeve having an aperture extending therethrough orientated parallel to a plane of said second end, said mounting bracket being positioned nearer to said second end than said first end; and
   a strap being removably coupled to said mounting bracket and extendable around the vertical support, a coupler on said strap coupling said strap in a closed loop.

9. The assembly according to claim 8, wherein said bottom wall has a plurality of water drainage holes extending therethrough.

10. The assembly according to claim 8, wherein said chute is arcuate from said first end to a central area of said chute.

11. The assembly according to claim 8, wherein said feeder further includes a cover, said cover being removably positionable over said second end of said chute to close said second end.

12. The assembly according to claim 11, wherein said cover is hingedly coupled to said chute.

13. The assembly according to claim 8, wherein said feeder includes at least one bird perch attached to and extending outwardly away from said perimeter wall.

14. A bird feeding assembly being extendable around and couplable to a vertical support, said assembly including:
   a plurality of feeders, each of said feeders including;
      a housing having a bottom wall and a perimeter wall being attached to and extending upwardly from said bottom wall, said perimeter wall having a fill opening extending therethrough, said perimeter wall including a rear wall, a front wall, a first lateral wall and a second lateral wall, said bottom wall having a plurality of water drainage holes extending therethrough, said fill opening being positioned in said rear wall;
      a chute having an open first end and an open second end, said first end being attached to said perimeter wall and being in fluid communication with said fill opening, said second end of said chute being positioned above said perimeter wall to funnel material poured into said second end outwardly of said first end and onto said bottom wall, said chute being arcuate from said first end to a central area of said chute, wherein bird feed is positionable in said chute to fill the housing with the bird feed;
      a mounting bracket being attached to said chute, said mounting bracket being positioned on a back side of said chute to position said chute between said mounting bracket and said housing, said mounting bracket comprising a sleeve having an aperture extending therethrough orientated parallel to a plane of said second end, said mounting bracket being positioned nearer to said second end than said first end;
      a cover removably positionable over said second end of said chute to close said second end, said cover being hingedly coupled to said chute;
      at least one bird perch being attached to and extending outwardly away from said perimeter wall; and
   a strap being removably coupled to said mounting brackets of each of said bird feeders and extendable around the vertical support, a coupler on said strap coupling said strap in a closed loop.

* * * * *